(12) United States Patent
Wisgo (10) Patent No.: US 10,819,695 B2
(45) Date of Patent: Oct. 27, 2020

(54) ELECTRONIC DEVICE INCLUDING LOCAL IDENTITY PROVIDER SERVER FOR SINGLE SIGN ON AND RELATED METHODS

(71) Applicant: CITRIX SYSTEMS, INC., Ft. Lauderdale, FL (US)

(72) Inventor: Jeffrey David Wisgo, Portland, OR (US)

(73) Assignee: CITRIX SYSTEMS, INC., Fort Lauderdale, FL (US)

( * ) Notice: Subject to any disclaimer, the term of this patent is extended or adjusted under 35 U.S.C. 154(b) by 301 days.

(21) Appl. No.: 15/990,258

(22) Filed: May 25, 2018

(65) Prior Publication Data
US 2019/0364033 A1 Nov. 28, 2019

(51) Int. Cl.
*H04L 29/06* (2006.01)

(52) U.S. Cl.
CPC ........ *H04L 63/0815* (2013.01); *H04L 63/083* (2013.01); *H04L 63/0876* (2013.01)

(58) Field of Classification Search
CPC H04L 63/0815; H04L 63/083; H04L 63/0876
See application file for complete search history.

(56) References Cited

U.S. PATENT DOCUMENTS

| | | | |
|---|---|---|---|
| 9,203,829 B1 * | 12/2015 | Levine | H04L 63/0815 |
| 9,548,976 B2 | 1/2017 | Belote et al. | |
| 2005/0278547 A1 * | 12/2005 | Hyndman | G06Q 20/4014 |
| | | | 713/185 |
| 2010/0306547 A1 * | 12/2010 | Fallows | G06F 21/31 |
| | | | 713/178 |
| 2013/0080769 A1 * | 3/2013 | Cha | H04L 63/168 |
| | | | 713/155 |
| 2013/0198801 A1 * | 8/2013 | Nishizawa | H04L 63/20 |
| | | | 726/1 |
| 2015/0058930 A1 * | 2/2015 | Mitchell | H04L 63/08 |
| | | | 726/3 |
| 2015/0365399 A1 * | 12/2015 | Biswas | H04L 63/0815 |
| | | | 726/8 |
| 2016/0080360 A1 | 3/2016 | Child et al. | |
| 2016/0219060 A1 * | 7/2016 | Karunakaran | H04L 63/0815 |
| 2016/0301684 A1 * | 10/2016 | He | H04L 63/108 |

(Continued)

*Primary Examiner* — Sarah Su
(74) *Attorney, Agent, or Firm* — Allen, Dyer, Doppelt & Gilchrist, P.A. Attorneys at Law (57) ABSTRACT

An electronic device may include a memory configured to store applications each associated with an initial identity provider (IDP) address for a remote single sign on (SSO) process. A controller may execute the applications, operate a local IDP server having a localhost IDP address associated therewith, and update the initial IDP address of the applications with the localhost IDP address. The local IDP server may, upon receipt of the request for IDP authentication from an application, determine whether an authentication token from a remote IDP server is stored in the memory, and when so, communicate the authentication token to the application, otherwise, obtain the authentication token from the remote IDP server, store the authentication token in the memory, and communicate the authentication token the given application for IDP authentication to permit the application to perform the remote SSO process.

17 Claims, 6 Drawing Sheets

(56) References Cited

U.S. PATENT DOCUMENTS

| | | | |
|---|---|---|---|
| 2016/0350296 A1* | 12/2016 | Li | G06F 16/174 |
| 2016/0366119 A1* | 12/2016 | Rykowski | G06F 21/41 |
| 2017/0346851 A1* | 11/2017 | Drake | H04W 12/02 |
| 2019/0007409 A1* | 1/2019 | Totale | H04L 63/029 |
| 2019/0058706 A1* | 2/2019 | Feijoo | G06F 21/335 |
| 2019/0069168 A1* | 2/2019 | Belote | G06F 21/31 |
| 2019/0132307 A1* | 5/2019 | Pitchaimani | H04L 63/0815 |
| 2019/0245848 A1* | 8/2019 | Divoux | H04L 63/0807 |
| 2019/0278616 A1* | 9/2019 | Momchilov | G06F 16/955 |

\* cited by examiner

ELECTRONIC DEVICE INCLUDING LOCAL IDENTITY PROVIDER SERVER FOR SINGLE SIGN ON AND RELATED METHODS

TECHNICAL FIELD

The present disclosure relates to the field of electronics, and more particularly, to a single sign on (SSO) for applications executed on an electronic device, and related methods.

BACKGROUND

Many electronic devices include applications, for example, in the case of a mobile electronic device, downloaded from an application or app store. A given electronic device, for example, may include many applications from different application providers and that perform different functions. For example, one application may be a banking application, while another application may be a weather application, or an electronic mail or messaging application.

Many applications typically require some form of authentication to operate or to perform desired functionality. However, authenticating each application may become cumbersome and time consuming for a user, and thus undesirable.

Accordingly, systems and methods have been developed that permit a single sign on (SSO) across multiple applications, for example, from different vendors or developers. However, communication between or among arbitrary and unrelated applications on a mobile device may be restricted, for example, for security reasons. One approach to addressing security while achieving SSO may be to build each application with a common software developer toolkit (SDK). However, this involves additional application development for each application developer as well as wholesale adoption of the SDK.

SUMMARY

An electronic device may include a memory configured to store a plurality of applications each associated with an initial identity provider (IDP) address for a remote single sign on (SSO) process. The electronic device may also include a controller coupled to the memory and configured to execute the plurality of applications, and operate a local IDP server having a localhost IDP address associated therewith. The controller may be configured to update the initial IDP address of each of the plurality of applications with the localhost IDP address so that, upon execution of the remote SSO process of a given one of the plurality of applications, the given application generates a request for IDP authentication to the local IDP server for the remote SSO process. The local IDP server may be configured to, upon receipt of the request for IDP authentication from the given application, determine whether an authentication token from a remote IDP server is stored in the memory, and when so, communicate the stored authentication token to the given application. Otherwise, the local IDP server is configured to obtain the authentication token from the remote IDP server, store the authentication token in the memory, and communicate the authentication token to the given application for IDP authentication to permit the given application to perform the remote SSO process during execution thereof.

The authentication token may be valid for a threshold time period. The local IDP server may be configured to, upon expiration of the threshold time period, obtain a new authentication token from the remote IDP server, for example.

The controller may be configured to operate the local IDP server according to the transmission control protocol (TCP), for example. The plurality of applications may include a plurality of sandboxed applications.

The electronic device may be associated with a user. The local IDP server may be configured to obtain the authentication token from the remote IDP server based upon credentials associated with the user, for example.

The request for IDP authentication from the given application comprises a hypertext transfer protocol (HTTP) request. The plurality of applications may have a vendor associated therewith different than a manufacturer associated with the electronic device, for example.

The electronic device may further include wireless communications circuitry coupled to the controller. The controller may be configured to cooperate with the wireless communications circuitry to perform at least one wireless communications function, for example.

The controller may be configured to update the initial IDP address of each of the plurality of applications with the localhost IDP address responsive to an administrative server. The localhost IDP address may include a uniform resource locator (URL), for example.

A method aspect is directed to a method of performing a remote single sign on (SSO) process using an electronic device that includes a memory configured to store a plurality of applications each associated with an initial identity provider (IDP) address for a remote single sign on (SSO) process and a controller coupled to the memory and configured to execute the plurality of applications. The method may include using the controller to operate a local IDP server having a localhost IDP address associated therewith and update the initial IDP address of each of the plurality of applications with the localhost IDP address so that, upon execution of the remote SSO process of a given one of the plurality of applications, the given application generates a request for IDP authentication to the local IDP server for the remote SSO process. The local IDP server may be operated to, upon receipt of the request for IDP authentication from the given application, determine whether an authentication token from a remote IDP server is stored in the memory, and when so, communicate the stored authentication token to the given application, otherwise, obtain the authentication token from the remote IDP server, store the authentication token in the memory, and communicate the authentication token the given application for IDP authentication to permit the given application to perform the remote SSO process during execution thereof.

A computer readable medium aspect is directed to a non-transitory computer readable medium for an electronic device that includes a memory configured to store a plurality of applications each associated with an initial identity provider (IDP) address for a remote single sign on (SSO) process and a controller coupled to the memory. The non-transitory computer readable medium includes computer executable instructions that when executed by the controller cause to the controller to perform operations. The operations may include executing the plurality of applications, operating a local IDP server having a localhost IDP address associated therewith, and updating the initial IDP address of each of the plurality of applications with the localhost IDP address so that, upon execution of the remote SSO process of a given one of the plurality of applications, the given application generates a request for IDP authentication to the local IDP server for the remote SSO process. Operating of the local IDP server may also include, upon receipt of the request for IDP authentication from the given application, determining whether an authentication token from a remote IDP server is stored in the memory, and when so, communicating the stored authentication token to the given application, otherwise, obtaining the authentication token from the remote IDP server, storing the authentication token in the memory, and communicating the authentication token to the given application for IDP authentication to permit the given application to perform the remote SSO process during execution thereof.

DETAILED DESCRIPTION

The present description is made with reference to the accompanying drawings, in which exemplary embodiments are shown. However, many different embodiments may be used, and thus the description should not be construed as limited to the particular embodiments set forth herein. Rather, these embodiments are provided so that this disclosure will be thorough and complete. Like numbers refer to like elements throughout, and prime notations are used to indicate similar elements in alternative embodiments.

As will be appreciated by one of skill in the art upon reading the following disclosure, various aspects described herein may be embodied as a device, a method or a computer program product (e.g., a non-transitory computer-readable medium having computer executable instruction for performing the noted operations or steps). Accordingly, those aspects may take the form of an entirely hardware embodiment, an entirely software embodiment or an embodiment combining software and hardware aspects.

Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof.

Figure 1:
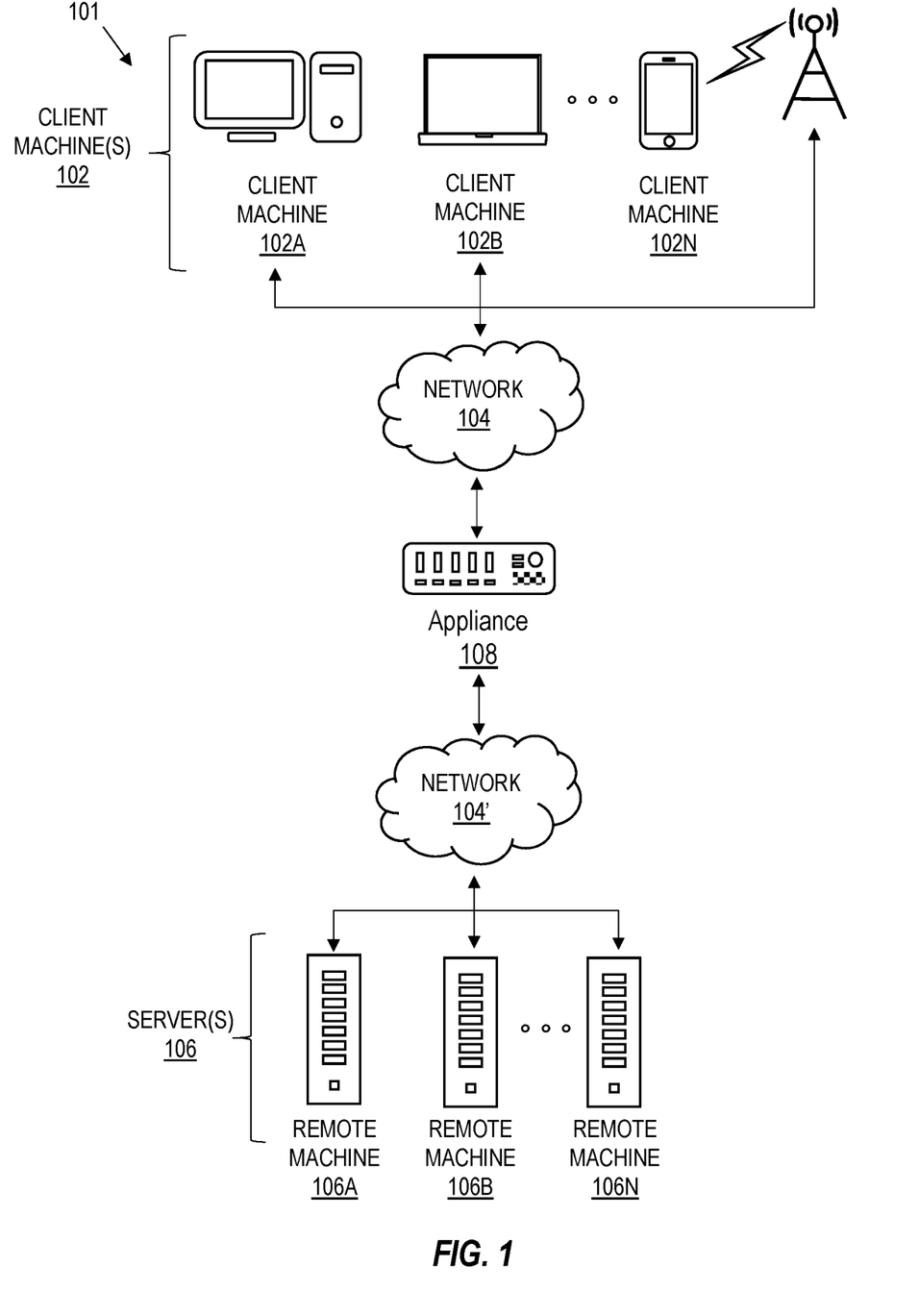
FIG. 1 is a block diagram of a network environment of computing devices in which various aspects of the disclosure may be implemented.

Referring initially to FIG. 1, a non-limiting network environment 101 in which various aspects of the disclosure may be implemented includes one or more client machines 102A-102N, one or more remote machines 106A-106N, one or more networks 104, 104', and one or more appliances 108 installed within the computing environment 101. The client machines 102A-102N communicate with the remote machines 106A-106N via the networks 104, 104'.

In some embodiments, the client machines 102A-102N communicate with the remote machines 106A-106N via an intermediary appliance 108. The illustrated appliance 108 is positioned between the networks 104, 104' and may be referred to as a network interface or gateway. In some embodiments, the appliance 108 may operate as an application delivery controller (ADC) to provide clients with access to business applications and other data deployed in a datacenter, the cloud, or delivered as Software as a Service (SaaS) across a range of client devices, and/or provide other functionality such as load balancing, etc. In some embodiments, multiple appliances 108 may be used, and the appliance(s) 108 may be deployed as part of the network 104 and/or 104'.

The client machines 102A-102N may be generally referred to as client machines 102, local machines 102, clients 102, client nodes 102, client computers 102, client devices 102, computing devices 102, endpoints 102, or endpoint nodes 102. The remote machines 106A-106N may be generally referred to as servers 106 or a server farm 106. In some embodiments, a client device 102 may have the capacity to function as both a client node seeking access to resources provided by a server 106 and as a server 106 providing access to hosted resources for other client devices 102A-102N. The networks 104, 104' may be generally referred to as a network 104. The networks 104 may be configured in any combination of wired and wireless networks.

A server 106 may be any server type such as, for example: a file server; an application server; a web server; a proxy server; an appliance; a network appliance; a gateway; an application gateway; a gateway server; a virtualization server; a deployment server; a Secure Sockets Layer Virtual Private Network (SSL VPN) server; a firewall; a web server; a server executing an active directory; or a server executing an application acceleration program that provides firewall functionality, application functionality, or load balancing functionality.

A server 106 may execute, operate or otherwise provide an application that may be any one of the following: software; a program; executable instructions; a virtual machine; a hypervisor; a web browser; a web-based client; a client-server application; a thin-client computing client; an ActiveX control; a Java applet; software related to voice over internet protocol (VoIP) communications like a soft IP telephone; an application for streaming video and/or audio; an application for facilitating real-time-data communications; a HTTP client; a FTP client; an Oscar client; a Telnet client; or any other set of executable instructions.

In some embodiments, a server 106 may execute a remote presentation client or other client or program that uses a thin-client or a remote-display protocol to capture display output generated by an application executing on a server 106 and transmits the application display output to a client device 102.

In yet other embodiments, a server 106 may execute a virtual machine providing, to a user of a client device 102, access to a computing environment. The client device 102 may be a virtual machine. The virtual machine may be managed by, for example, a hypervisor, a virtual machine manager (VMM), or any other hardware virtualization technique within the server 106.

In some embodiments, the network 104 may be: a local-area network (LAN); a metropolitan area network (MAN); a wide area network (WAN); a primary public network 104; and a primary private network 104. Additional embodiments may include a network 104 of mobile telephone networks that use various protocols to communicate among mobile devices. For short range communications within a WLAN, the protocols may include 802.11, Bluetooth, and Near Field Communication (NFC).

Figure 2:
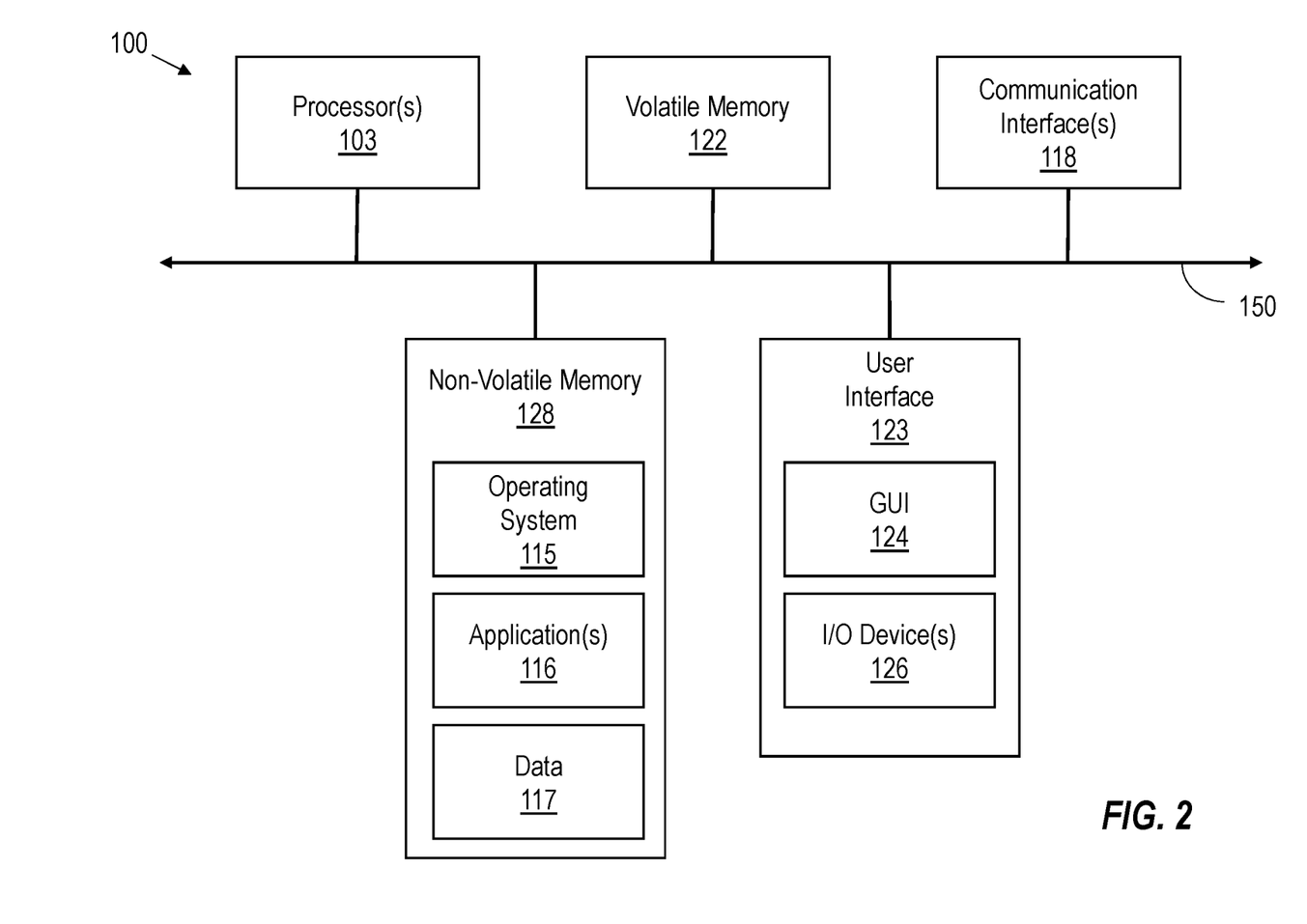
FIG. 2 is a block diagram of a computing device useful for practicing an embodiment of the client machines or the remote machines illustrated in FIG. 1.

FIG. 2 depicts a block diagram of a computing device 100 useful for practicing an embodiment of client devices 102 or servers 106. The computing device 100 includes one or more processors 103, volatile memory 122 (e.g., random access memory (RAM)), non-volatile memory 128, user interface (UI) 123, one or more communications interfaces 118, and a communications bus 150.

The non-volatile memory 128 may include: one or more hard disk drives (HDDs) or other magnetic or optical storage media; one or more solid state drives (SSDs), such as a flash drive or other solid state storage media; one or more hybrid magnetic and solid state drives; and/or one or more virtual storage volumes, such as a cloud storage, or a combination of such physical storage volumes and virtual storage volumes or arrays thereof.

The user interface 123 may include a graphical user interface (GUI) 124 (e.g., a touchscreen, a display, etc.) and one or more input/output (I/O) devices 126 (e.g., a mouse, a keyboard, a microphone, one or more speakers, one or more cameras, one or more biometric scanners, one or more environmental sensors, and one or more accelerometers, etc.).

The non-volatile memory 128 stores an operating system 115, one or more applications 116, and data 117 such that, for example, computer instructions of the operating system 115 and/or the applications 116 are executed by processor(s) 103 out of the volatile memory 122. In some embodiments, the volatile memory 122 may include one or more types of RAM and/or a cache memory that may offer a faster response time than a main memory. Data may be entered using an input device of the GUI 124 or received from the I/O device(s) 126. Various elements of the computer 100 may communicate via the communications bus 150.

The illustrated computing device 100 is shown merely as an example client device or server, and may be implemented by any computing or processing environment with any type of machine or set of machines that may have suitable hardware and/or software capable of operating as described herein.

The processor(s) 103 may be implemented by one or more programmable processors to execute one or more executable instructions, such as a computer program, to perform the functions of the system. As used herein, the term "processor" describes circuitry that performs a function, an operation, or a sequence of operations. The function, operation, or sequence of operations may be hard coded into the circuitry or soft coded by way of instructions held in a memory device and executed by the circuitry. A processor may perform the function, operation, or sequence of operations using digital values and/or using analog signals.

In some embodiments, the processor can be embodied in one or more application specific integrated circuits (ASICs), microprocessors, digital signal processors (DSPs), graphics processing units (GPUs), microcontrollers, field programmable gate arrays (FPGAs), programmable logic arrays (PLAs), multi-core processors, or general-purpose computers with associated memory.

The processor may be analog, digital or mixed-signal. In some embodiments, the processor may be one or more physical processors, or one or more virtual (e.g., remotely located or cloud) processors. A processor including multiple processor cores and/or multiple processors may provide functionality for parallel, simultaneous execution of instructions or for parallel, simultaneous execution of one instruction on more than one piece of data.

The communications interfaces 118 may include one or more interfaces to enable the computing device 100 to access a computer network such as a Local Area Network (LAN), a Wide Area Network (WAN), a Personal Area Network (PAN), or the Internet through a variety of wired and/or wireless connections, including cellular connections.

In described embodiments, the computing device 100 may execute an application on behalf of a user of a client device. For example, the computing device 100 may execute one or more virtual machines managed by a hypervisor. Each virtual machine may provide an execution session within which applications execute on behalf of a user or a client device, such as a hosted desktop session. The computing device 100 may also execute a terminal services session to provide a hosted desktop environment. The computing device 100 may provide access to a remote computing environment including one or more applications, one or more desktop applications, and one or more desktop sessions in which one or more applications may execute.

Additional descriptions of a computing device 100 configured as a client device 102 or as a server 106, or as an appliance intermediary to a client device 102 and a server 106, and operations thereof, may be found in U.S. Pat. Nos. 9,176,744 and 9,538,345, which are incorporated herein by reference in their entirety. The '744 and '345 patents are both assigned to the current assignee of the present disclosure.

Figure 3:
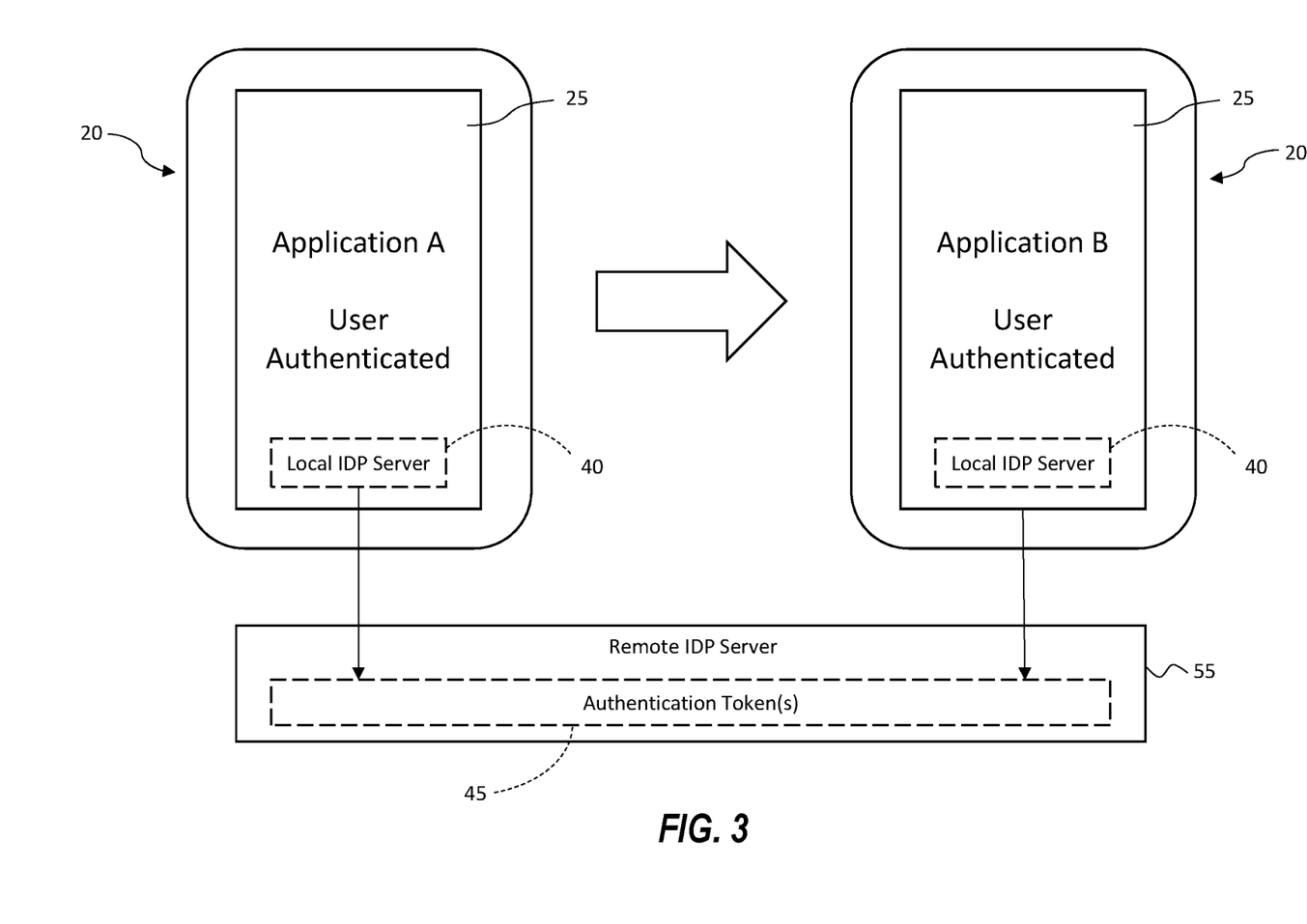
FIG. 3 is a schematic diagram of an SSO process using an electronic device according to an embodiment.
Figure 4:
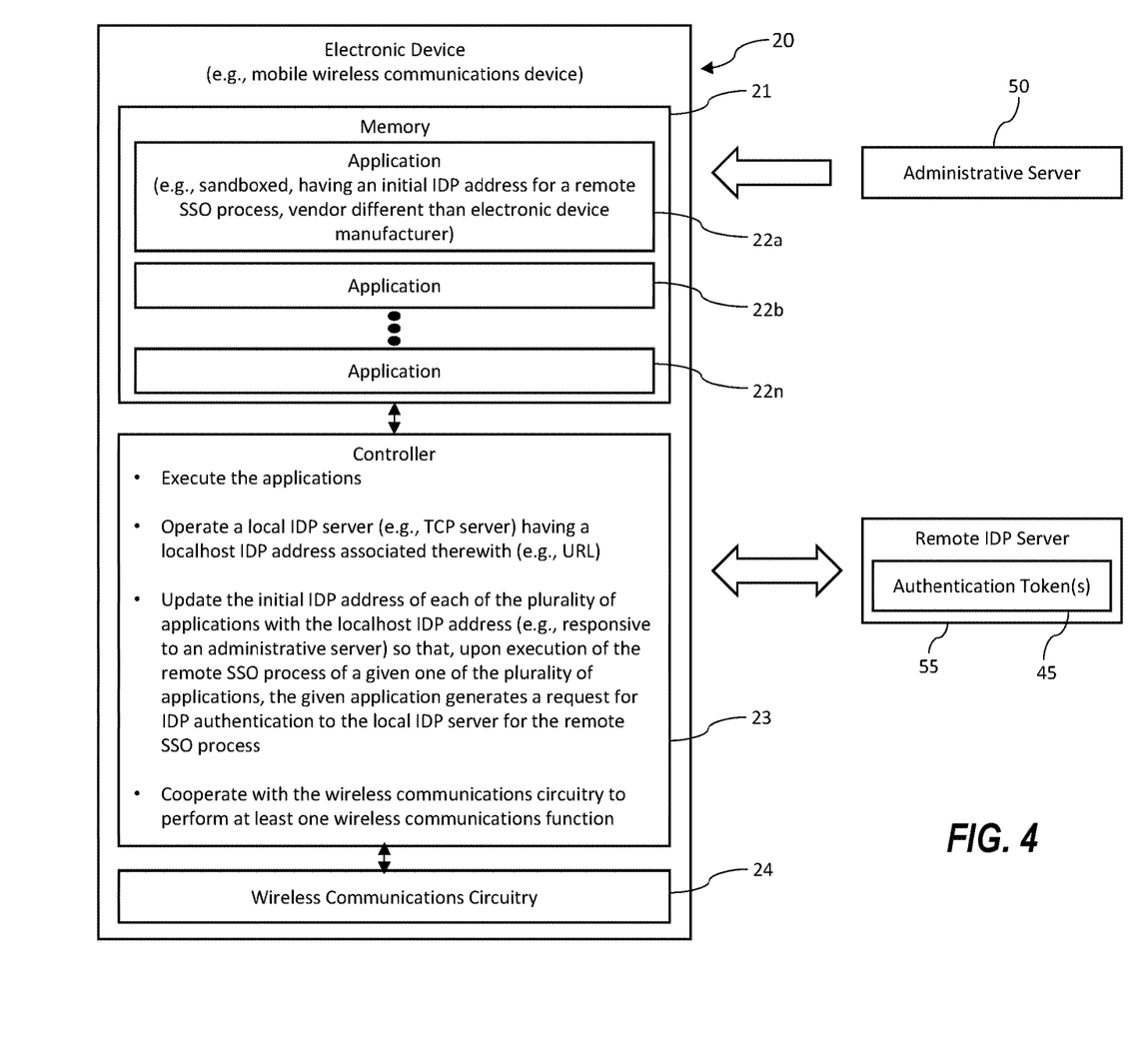
FIG. 4 is a schematic block diagram of an SSO system including an electronic device according to an embodiment.
Figure 5:
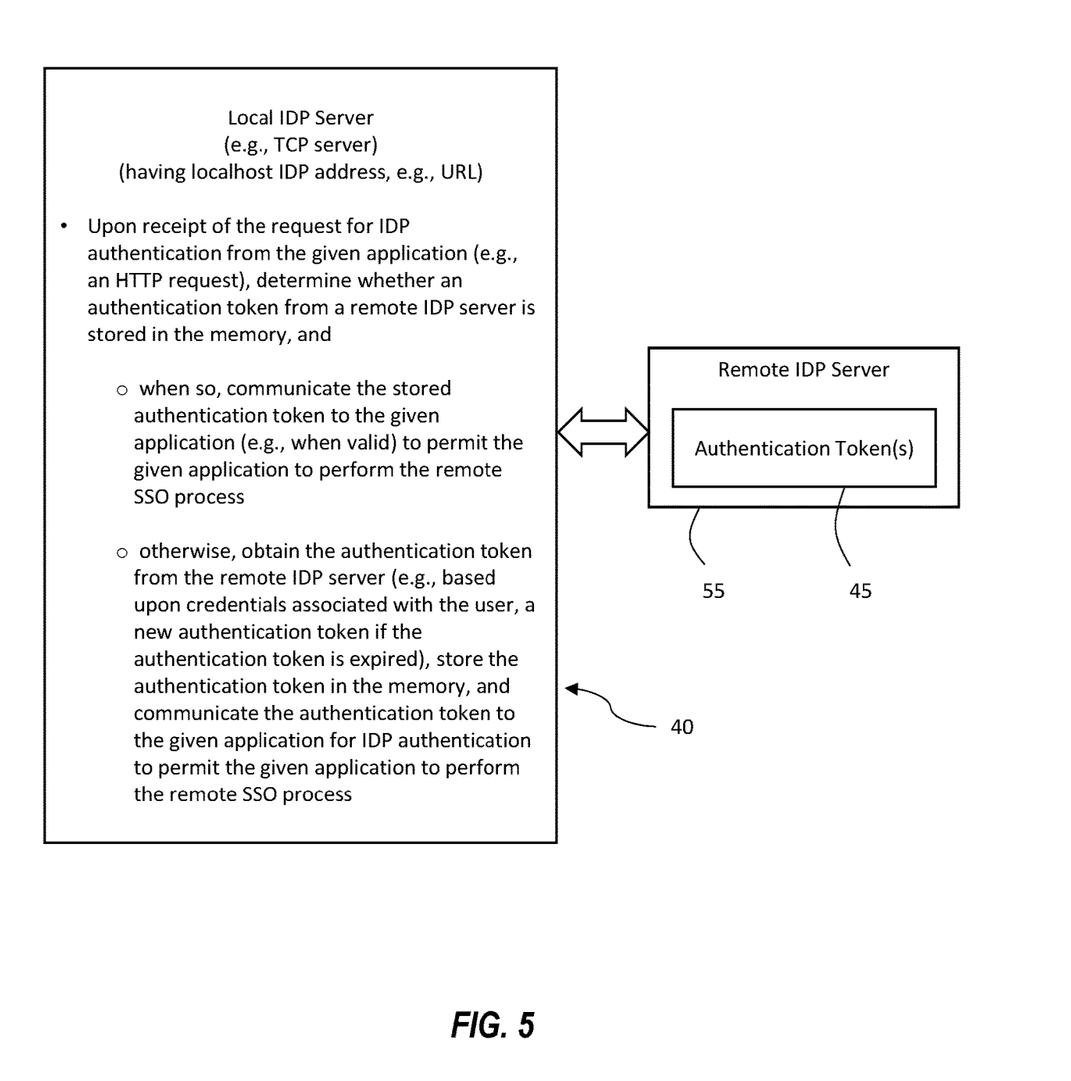
FIG. 5 is a more detailed schematic block diagram of a portion of the SSO system of FIG. 4.

Referring now to FIGS. 3-5, an electronic device 20 includes a memory 21 that stores applications 22a-22n. The applications may be third-party applications. In other words, the applications 22a-22n may have been downloaded from an application store, for example, to the memory 21 and may have been authored from a company or developer that is different than or not associated with the manufacturer of the electronic device 20. The applications 22a-22n may be sandboxed applications. That is, as will be appreciated by those skilled in the art, one or more of the applications 22a-22n may each operate or be executed in a separate or restricted environment. That way, if an error or security issue were to occur with an application 22a-22n, the error or issue will generally not spread to or affect other applications.

Each of the applications 22a-22n is also associated with an initial identity provider (IDP) address for a remote single sign on (SSO) process. As will be appreciated by those skilled in the art, an identity provider may be a system or one or more servers, including a processor and a memory, that provides authentication services through management of identity information. The initial IDP address may be a uniform resource locator (URL), for example, of an IDP system or server. The initial IDP address may be considered a default address configured by the application developer. The IDP system or server may be accessed by each application for performing an SSO process or operation. Being sandboxed, each application 22a-22n may permit configuration of certain parameters by a third party (i.e., not the application developer), for example, the IDP address.

The electronic device 20 also includes a controller 23 coupled to the memory 21. The controller 23 executes or runs the applications 22a-22n. The electronic device 20 also includes wireless communications circuitry 24 coupled to the controller 23. The wireless communications circuitry 24 may include WiFi, cellular, Bluetooth, near-field communications (NFC), and/or other short and/or long-range wireless communications circuitry. The controller 23 and the wireless communications circuitry 24 cooperate to perform at least one wireless communications function, for example, wirelessly communicating voice and/or data. Accordingly, the electronic device 20 may be in the form of a mobile wireless communications device, such as, for example, a mobile or smart phone, tablet computer, wearable device, etc. In some embodiments, the electronic device 20 may not be a mobile wireless communications device, for example, a personal computer.

Figure 6:
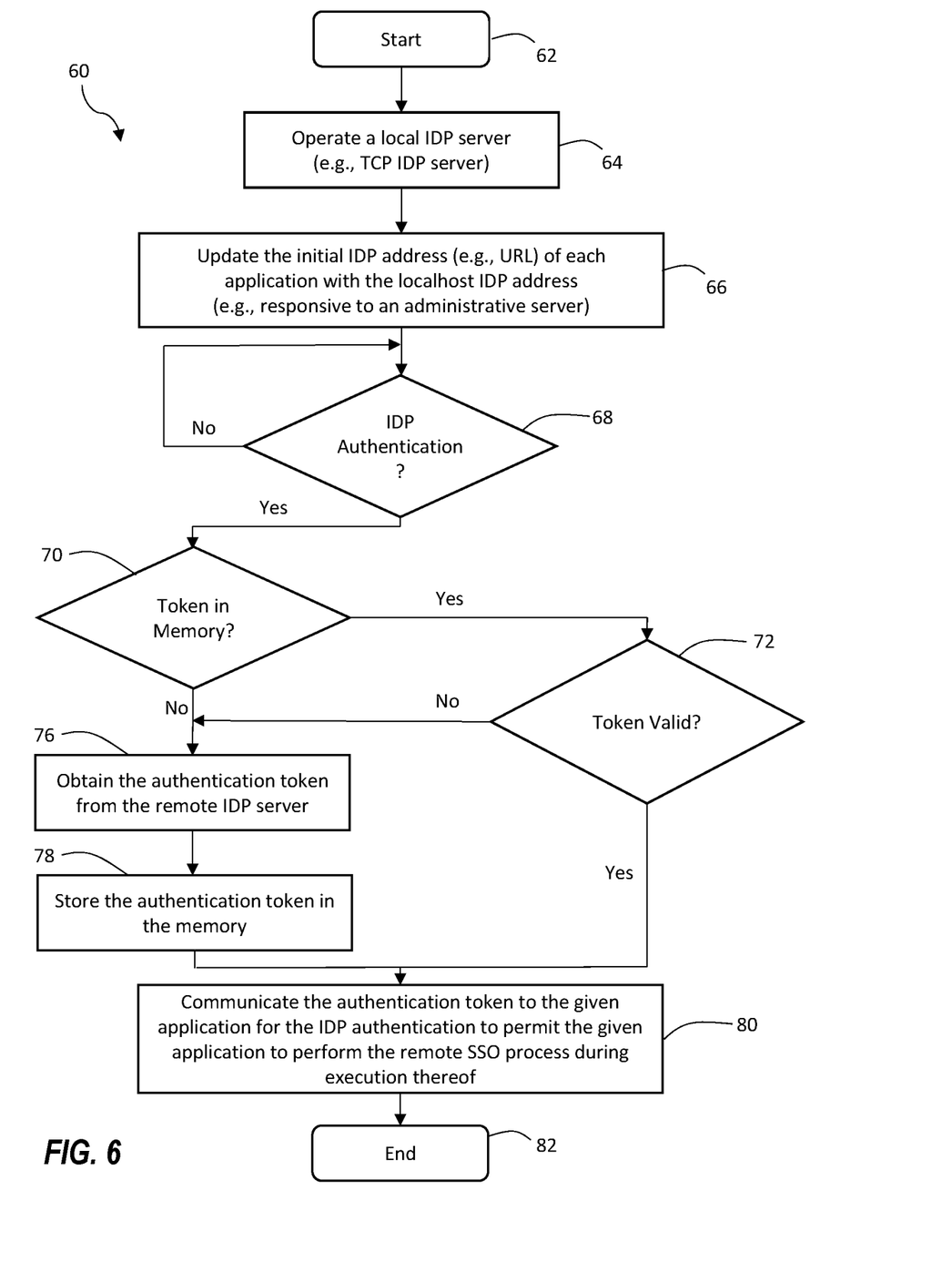
FIG. 6 is a flow diagram illustrating operation of an electronic device according to an embodiment.

Referring now additionally to the flowchart 60 in FIG. 6, beginning at Block 62, operation of the electronic device 20 with respect to an exemplary SSO operation will now be described. More particularly, the controller 23 operates or establishes, at Block 64, a local IDP server 40, for example, from the memory 21. The local IDP server 40 may be a TCP IDP server operating according to the TCP, and may be embodied in a standalone application. The local IDP server 40 has a localhost IDP address associated therewith. The localhost IDP address may be a URL including a port number, e.g., localhost:1234. The port number may be arbitrary, for example.

At Block 66, the controller 23 updates the initial IDP address of each of the applications 22a-22n with the localhost IDP address so that, upon execution of the remote SSO process of a given application, the given application generates a request for IDP authentication to the local IDP server for the remote SSO process. The controller 23 may update the initial IDP address responsive to an administrator or instructions from an administrative server 50. The controller 23 may update the initial IDP address responsive to a pushed configuration (e.g., mobile device management). The controller 23 may also update the initial IDP address responsive to a request from the application 22a-22n. The controller 23 may further update the initial IDP address via a web-based server in the cloud, for example, and/or through operations of the local IDP server 40.

At Block 68 a determination is made as to whether the given application or any application 22a-22n with an updated IDP address has made a request for IDP authentication, for example by the controller 23, and more particularly, by the local IDP server 40. If a request has not been made (Block 68), polling may occur until such a request from one of the applications 22a-22n is made. The request may be made responsive to or based upon execution of a given application 22a-22n, for example, upon start-up of the application, and/or upon a specific request for authentication during operation of the given application, etc.

As will be appreciated by those skilled in the art, TCP connections are typically permitted between or among sandboxed applications, and thus, IDP authentication requests are typically permitted. Upon receipt of the request for IDP authentication from the given application (Block 68), which may be in the form of a hypertext transfer protocol (HTTP) request, the local IDP server 40 determines, at Block 70, whether an authentication token 45 from a remote IDP server 55 associated with a remote IDP is stored in the memory 21. As will be appreciated by those skilled in the art, the remote IDP server 55 includes a processor and memory cooperating therewith to perform remote identity or authentication functions, such as, for example, for a remote SSO.

If at Block 70 when an authentication token is stored in the memory 21, the local IDP server 40 determines whether the authentication token 45 is valid (Block 72). In other words, the authentication token 45 has a valid time period associated therewith or is valid for a threshold time period. If the authentication token 45 is valid (Block 72), the local IDP server 40 communicates the stored authentication token 45 to the given or requesting application (Block 80).

If no authentication token 45 is stored in the memory 21 (Block 70) or the authentication token is not valid (Block 72), the local IDP server 40 obtains the authentication token from the remote IDP server 55 (Block 76). The authentication token 45 may be obtained based upon credentials associated with the user of the electronic device 20, for example, username, password, and/or device ID. Of course, other credentials may be used, or no credentials may be used.

The authentication token 45, upon being obtained, is stored in the memory 21 (Block 78), and communicated to the given application 22a-22n for IDP authentication to permit the given application to perform the remote SSO process during execution of the given application (Block 80). While a token has been described herein, it will be appreciated by those skilled in the art that other and/or additional techniques may be used, such as, for example, a personal identification number (PIN) may additionally be used. The operations end at Block 82.

In one example (FIG. 3), Applications A and B may be configured or updated with the localhost IDP address. Application A may make the request for IDP authentication as described above and provide authentication for example through a user interface (UI) on a display 25 of the electronic device 20 (FIG. 3). Application B, for example, which is provided from another developer, executed on the same electronic device 20 as Application A, and cannot communicate with Application A because of the sandboxed architecture, may subsequently make a request for IDP authentication. If the authentication token 45 is valid, Application B will receive the authentication token and, accordingly, Application B will be functional without a second or separate login (i.e., able to authenticate using the SSO process). User feedback may be provided accordingly via the display 25 (FIG. 3). If, however, the authentication token 45 has expired, a new authentication token will be obtained or retrieved and passed on to Application B for SSO authentication.

Advantageously, for an SSO process, the electronic device 20 described herein does not involve any modification to the applications 22a-22n within the sandbox (i.e., recoding), but rather a change in configuration for the IDP URL, which may typically be done through an administrative console or server 50, or in some embodiments, within the application itself. Existing approaches for SSO generally require modifications to the applications (rather than configuration changes, e.g., within the sandbox), use of an SDK, or involve paging or switching context (e.g., visually) among the different applications.

One advantage of the electronic device 20 and operations thereof described herein may be that since all IDP traffic typically goes through a single point (i.e., the local TCP IDP server 40), one or more tokens 45 can be shared by all applications 22a-22n on the device 20 (that are configured for the localhost IDP). Another advantage may include that the IDP, which is contacted externally, can be dynamic, and even multiple IDPs can be contacted (e.g., allowing bridging between IDPs).

As will be appreciated by those skilled in the art, to achieve SSO among the applications 22a-22n, the embodiments described herein are based upon the local IDP server 40. However, the local IDP server 40 may be implementation dependent—that is, some platforms, such as iOS, may involve using a device-level virtual private network (VPN) or application-level VPN to host the IDP server. However, it should be noted that VPN functionality may not have to be actually used, so a VPN server would typically not be desirable. As will be appreciated by those skilled in the art, other mobile platforms may have different implementation options. In a conventional SSO system, for example, for sandboxed applications, a separate login to each application is needed despite the fact that the applications may actually communicate with the same IDP server.

Additionally, the embodiments described herein may be extended to permit SSO across multiple electronic devices. In some embodiments, SSO may be achieved with different categories of applications so that may SSO works with applications within that category. Other security features, such as, for example, a finger biometric or a global positioning system (GPS) (e.g., geo-fencing), could be used to increase security. The properties of the local IDP server 40 may be controlled remotely by policies set on an administrative console or system 50.

The local IDP server 40 may also include or execute a UI, which may display on a display 25 of the electronic device 20, information about tokens 45 and expiry times, and may permit these tokens to be cleared, renewed, etc. For example, an SDK could be implemented so that users who have VPN applications could integrate or implement the local IDP server 40 within their applications.

A method aspect is directed to a method of performing a remote single sign on (SSO) process using an electronic device 20 that includes a memory 21 configured to store a plurality of applications 22a-22n each associated with an initial identity provider (IDP) address for a remote single sign on (SSO) process and a controller 23 coupled to the memory and configured to execute the plurality of applications. The method includes using the controller 23 to operate a local IDP server 40 having a localhost IDP address associated therewith and to update the initial IDP address of each of the plurality of applications 22a-22n with the localhost IDP address so that, upon execution of the remote SSO process of a given one, of the plurality of applications, the given application generates a request for IDP authentication to the local IDP server 40 for the remote SSO process. The local IDP server 40 is operated to, upon receipt of the request for IDP authentication from the given application 22a-22n, determine whether an authentication token 45 from a remote IDP server 55 is stored in the memory 21, and when so, communicate the stored authentication token to the given application, otherwise, obtain the authentication token from the remote IDP server, store the authentication token in the memory, and communicate the authentication token the given application for IDP authentication to permit the given application to perform the remote SSO process during execution thereof.

A computer readable medium aspect is directed to a non-transitory computer readable medium for an electronic device 20 that includes a memory 21 configured to store a plurality of applications each associated with an initial identity provider (IDP) address for a remote single sign on (SSO) process and a controller 23 coupled to the memory. The non-transitory computer readable medium includes computer executable instructions that when executed by the controller 23 cause to the controller to perform operations. The operations include executing the plurality of applications 22a-22n and operating a local IDP server 40 having a localhost IDP address associated therewith and updating the initial IDP address of each of the plurality of applications 22a-22n with the localhost IDP address so that, upon execution of the remote SSO process of a given one of the plurality of applications, the given application generates a request for IDP authentication to the local IDP server 40 for the remote SSO process. Operating of the local IDP server 40 includes, upon receipt of the request for IDP authentication from the given application 22a-22n, determining whether an authentication token 45 from a remote IDP server 55 is stored in the memory 21, and when so, communicating the stored authentication token to the given application, otherwise, obtaining the authentication token from the remote IDP server, storing the authentication token in the memory, and communicating the authentication token the given application for IDP authentication to permit the given application to perform the remote SSO process during execution thereof.

Many modifications and other embodiments will come to the mind of one skilled in the art having the benefit of the teachings presented in the foregoing descriptions and the associated drawings. Therefore, it is understood that the disclosure is not to be limited to the specific embodiments disclosed, and that modifications and embodiments are intended to be included within the scope of the appended claims.

That which is claimed:

1. An electronic device comprising:
a memory configured to store a plurality of sandboxed applications each associated with an initial identity provider (IDP) address for a remote single sign on (SSO) process; and
a controller comprising processing circuitry coupled to the memory and configured to
execute the plurality of sandboxed applications each performing a different application function, and
operate a local IDP server having a localhost IDP address associated therewith, and
update the initial IDP address of each of the plurality of sandboxed applications with the localhost IDP address so that, upon execution of the remote SSO process of a given one of the plurality of sandboxed applications, the given sandboxed application generates a request for IDP authentication to the local IDP server for the remote SSO process,
the local IDP server configured to
upon receipt of the request for IDP authentication from the given sandboxed application, determine whether an authentication token from a remote IDP server is stored in the memory, and when so, communicate the stored authentication token to the given sandboxed application, otherwise, obtain the authentication token from the remote IDP server, store the authentication token in the memory, and communicate the authentication token to the given sandboxed application for IDP authentication to permit the given sandboxed application to perform the remote SSO process during execution thereof.

2. The electronic device of claim 1 wherein the authentication token is valid for a threshold time period; and wherein the local IDP server is configured to, upon expiration of the threshold time period, obtain a new authentication token from the remote IDP server.

3. The electronic device of claim 1 wherein the controller is configured to operate the local IDP server according to the transmission control protocol (TCP).

4. The electronic device of claim 1 wherein the electronic device is associated with a user; and wherein the local IDP server is configured to obtain the authentication token from the remote IDP server based upon credentials associated with the user.

5. The electronic device of claim 1 wherein the request for IDP authentication from the given sandboxed application comprises a hypertext transfer protocol (HTTP) request.

6. The electronic device of claim 1 wherein the plurality of sandboxed applications have a vendor associated therewith different than a manufacturer associated with the electronic device.

7. The electronic device of claim 1 further comprising wireless communications circuitry coupled to the controller, and wherein the controller is configured to cooperate with the wireless communications circuitry to perform at least one wireless communications function.

8. The electronic device of claim 1 wherein the controller is configured to update the initial IDP address of each of the plurality of sandboxed applications with the localhost IDP address responsive to an administrative server.

9. The electronic device of claim 1 wherein the localhost IDP address comprises a uniform resource locator (URL).

10. A method of performing a remote single sign on (SSO) process using an electronic device comprising a memory configured to store a plurality of sandboxed applications each associated with an initial identity provider (IDP) address for a remote SSO process and each performing a different application function, and a controller coupled to the memory and configured to execute the plurality of sandboxed applications, the method comprising:
using the controller to operate a local IDP server having a localhost IDP address associated therewith, the controller being used to
update the initial IDP address of each of the plurality of sandboxed applications with the localhost IDP address so that, upon execution of the remote SSO process of a given one of the plurality of sandboxed applications, the given sandboxed application generates a request for IDP authentication to the local IDP server for the remote SSO process,
the local IDP server being operated to
upon receipt of the request for IDP authentication from the given sandboxed application, determine whether an authentication token from a remote IDP server is stored in the memory, and when so, communicate the stored authentication token to the given sandboxed application, otherwise, obtain the authentication token from the remote IDP server, store the authentication token in the memory, and communicate the authentication token to the given sandboxed application for IDP authentication to permit the given sandboxed application to perform the remote SSO process during execution thereof.

11. The method of claim 10 wherein the authentication token is valid for a threshold time period; and wherein the local IDP server is operated to, upon expiration of the threshold time period, obtain a new authentication token from the remote IDP server.

12. The method of claim 10 wherein the controller is used to operate the local IDP server according to the transmission control protocol (TCP).

13. The method of claim 10 wherein the request for IDP authentication from the given sandboxed application comprises a hypertext transfer protocol (HTTP) request.

14. A non-transitory computer readable medium for an electronic device comprising a memory configured to store a plurality of sandboxed applications each associated with an initial identity provider (IDP) address for a remote single sign on (SSO) process and each performing a different application function, and a controller coupled to the memory, the non-transitory computer readable medium comprising computer executable instructions that when executed by the controller cause to the controller to perform operations comprising:
executing the plurality of sandboxed applications;
operating a local IDP server having a localhost IDP address associated therewith; and
updating the initial IDP address of each of the plurality of sandboxed applications with the localhost IDP address so that, upon execution of the remote SSO process of a given one of the plurality of sandboxed applications, the given sandboxed application generates a request for IDP authentication to the local IDP server for the remote SSO process;
the operations of the local IDP server comprising
upon receipt of the request for IDP authentication from the given sandboxed application, determining whether an authentication token from a remote IDP server is stored in the memory, and when so, communicating the stored authentication token to the given sandboxed application, otherwise, obtaining the authentication token from the remote IDP server, storing the authentication token in the memory, and communicating the authentication token to the given sandboxed application for IDP authentication to permit the given sandboxed application to perform the remote SSO process during execution thereof.

15. The non-transitory computer readable medium of claim 14 wherein the authentication token is valid for a threshold time period; and wherein the operations of the local IDP server comprise, upon expiration of the threshold time period, obtaining a new authentication token from the remote IDP server.

16. The non-transitory computer readable medium of claim 14 wherein the operations comprise operating the local IDP server according to the transmission control protocol (TCP).

17. The non-transitory computer readable medium of claim 14 wherein the request for IDP authentication from the given sandboxed application comprises a hypertext transfer protocol (HTTP) request.

* * * * *